(12) United States Patent
Hsu

(10) Patent No.: US 11,493,838 B2
(45) Date of Patent: Nov. 8, 2022

(54) OPTICAL DEVICE

(71) Applicant: DELTA ELECTRONICS, INC., Taoyuan (TW)

(72) Inventor: Ming-Yo Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 1255 days.

(21) Appl. No.: 15/260,332

(22) Filed: Sep. 9, 2016

(65) Prior Publication Data

US 2016/0377966 A1 Dec. 29, 2016

Related U.S. Application Data

(63) Continuation-in-part of application No. 14/950,920, filed on Nov. 24, 2015.

(60) Provisional application No. 62/136,126, filed on Mar. 20, 2015.

(30) Foreign Application Priority Data

Jul. 5, 2016 (TW) ................. 105121173

(51) Int. Cl.
| | |
|---|---|
| *G03B 21/16* | (2006.01) |
| *G03B 21/20* | (2006.01) |
| *G03B 33/16* | (2006.01) |
| *G02B 26/00* | (2006.01) |
| *G03B 33/00* | (2006.01) |

(52) U.S. Cl.
CPC ........... *G03B 21/16* (2013.01); *G02B 26/008* (2013.01); *G03B 21/204* (2013.01); *G03B 21/2013* (2013.01); *G03B 21/2053* (2013.01); *G03B 33/00* (2013.01); *G03B 33/16* (2013.01)

(58) Field of Classification Search
CPC ............ G03B 21/204; G03B 21/00–64; G02B 26/008; H04N 9/31–3197
See application file for complete search history.

(56) References Cited

U.S. PATENT DOCUMENTS

| | | | |
|---|---|---|---|
| 7,532,176 | B2 | 5/2009 | Imade |
| 8,403,492 | B2 | 3/2013 | Shibasaki |
| 9,146,452 | B2 | 9/2015 | Guthrie |
| 2004/0070841 | A1 | 4/2004 | Bierhuizen |
| 2010/0245777 | A1 | 9/2010 | Ogura |
| 2011/0211333 | A1 * | 9/2011 | Bartlett ................ G03B 21/204 362/84 |

(Continued)

FOREIGN PATENT DOCUMENTS

| | | |
|---|---|---|
| CN | 100459678 C | 2/2009 |
| CN | 102650813 A | 8/2012 |

(Continued)

*Primary Examiner* — Christopher A Lamb, II

(74) *Attorney, Agent, or Firm* — CKC & Partners Co., LLC

(57) ABSTRACT

An optical device includes a phosphor wheel and two light sources. The phosphor wheel has two phosphor regions. The phosphor regions are located at different radial positions of the phosphor wheel and are not overlapped. Each of the phosphor regions has a plurality of color sections. The light sources emit two light beams so as to respectively provide two light spots on the phosphor wheel. During the rotation of the phosphor wheel, the light spots are located at the color sections having the same fluorescent characteristic respectively in the phosphor regions.

21 Claims, 6 Drawing Sheets

(56) References Cited

U.S. PATENT DOCUMENTS

| | | | |
|---|---|---|---|
| 2012/0242912 A1* | 9/2012 | Kitano | H04N 9/3111 348/759 |
| 2012/0268503 A1* | 10/2012 | Sugiyama | H04N 9/3161 345/690 |
| 2012/0300178 A1* | 11/2012 | Sugiyama | H04N 9/3111 353/31 |
| 2013/0033682 A1 | 2/2013 | Hsu et al. | |
| 2013/0235352 A1* | 9/2013 | Hsu | G03B 21/14 353/31 |
| 2014/0226306 A1* | 8/2014 | Khan | G02B 26/008 362/84 |
| 2014/0347634 A1 | 11/2014 | Bommerbach et al. | |
| 2015/0192848 A1* | 7/2015 | Okuno | G03B 21/2066 348/759 |
| 2015/0219984 A1* | 8/2015 | Matsubara | G02B 26/008 353/31 |

FOREIGN PATENT DOCUMENTS

| | | |
|---|---|---|
| CN | 102720986 A | 10/2012 |
| CN | 202771146 U | 3/2013 |
| CN | 104516177 A | 4/2015 |
| CN | 104765239 A | 7/2015 |
| JP | 2004317528 A | 11/2004 |
| JP | 2007293033 A | 11/2007 |
| TW | 201337437 A | 9/2013 |
| WO | 2014174559 A1 | 10/2014 |

* cited by examiner

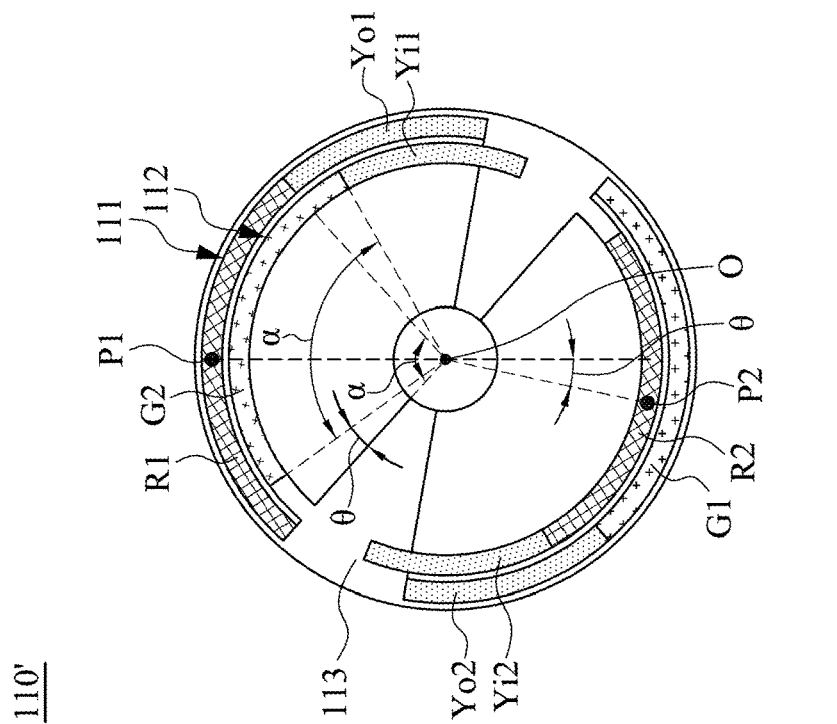
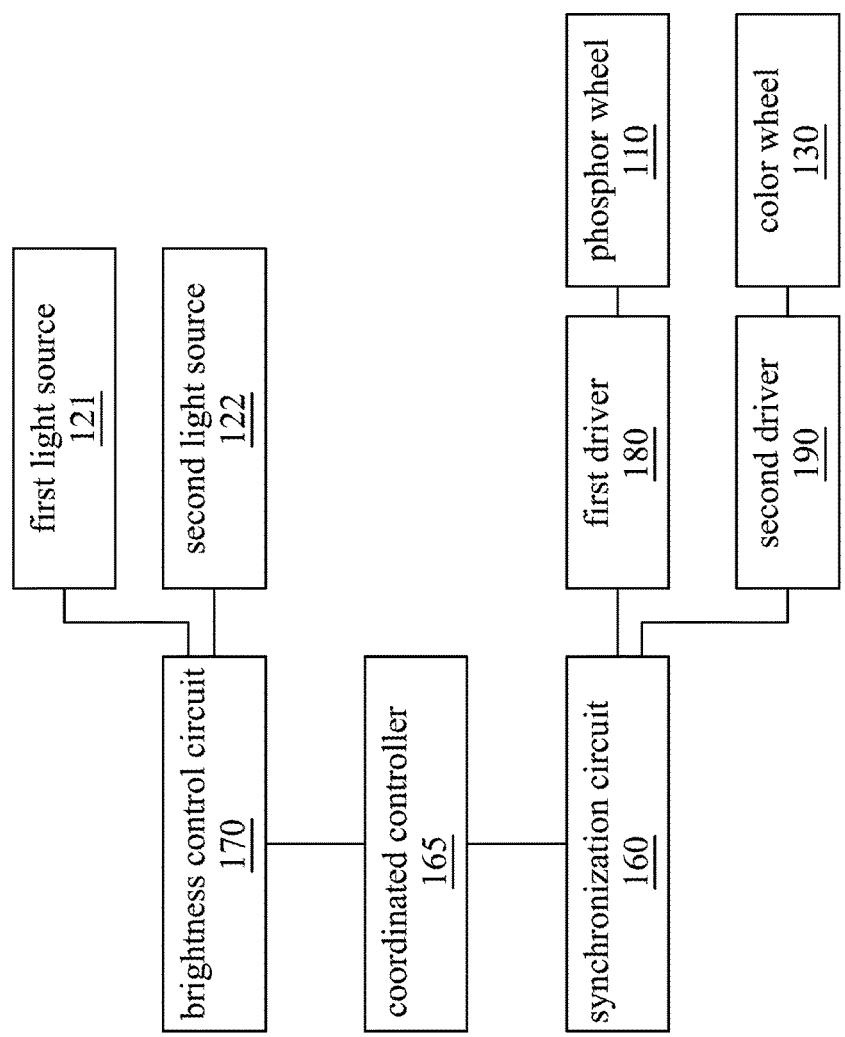
Fig. 3
Fig. 2

OPTICAL DEVICE

RELATED APPLICATIONS

This application is a Continuation-in-part of U.S. application Ser. No. 14/950,920, filed on Nov. 24, 2015, which claims priority of U.S. Provisional Application Ser. No. 62/136,126, filed on Mar. 20, 2015. This application claims priority to Taiwan Application Serial Number 105121173, filed Jul. 5, 2016, which is herein incorporated by reference.

BACKGROUND

Technical Field

The present disclosure relates to an optical device, and more particularly, to a projector.

Description of Related Art

In prior arts, projectors use lasers (usually a blue laser) collocating with fluorescent elements to provide light. However, after a long period of use, owing to the thermal decay effect, excitation efficiencies of the fluorescent elements decrease. The decreases of excitation efficiencies of the fluorescent elements commonly occur to one-chip DLP (Digital Light Processing) projectors or three-chip DLP projectors. Therefore, how to improve the cooling capacity of a fluorescent element to enhance the luminous efficiency has become a problem of solid-state lighting that must be addressed.

SUMMARY

An aspect of the disclosure is to provide an optical device that can further improve excitation efficiency of fluorescent element under the premise of reducing heat accumulation to prevent the fluorescent element from thermal decay effect.

According to an embodiment of the disclosure, an optical device includes a phosphor wheel and two light sources. The phosphor wheel has two phosphor regions. The phosphor regions are located at different radial positions of the phosphor wheel and not overlapped. Each of the phosphor regions has a plurality of color sections. The light sources emit two light beams so as to respectively provide two light spots on the phosphor wheel. The light spots are respectively located at the phosphor regions. During the rotation of the phosphor wheel, the light spots are located at the color sections having the same fluorescent characteristic respectively in the phosphor regions.

In an embodiment of the disclosure, the optical device further includes a color wheel. The color wheel is configured to receive lights excited by the phosphor regions.

In an embodiment of the disclosure, the optical device further includes a condensing optical module. The condensing optical module is configured to receive the lights excited by the phosphor regions and then guide the excited lights to the color wheel.

In an embodiment of the disclosure, the optical device further includes an integrator rod. The integrator rod is configured to receive the lights guided by the condensing optical module and then guide the lights to the color wheel.

In an embodiment of the disclosure, the optical device further includes a first driver, a second driver, and a synchronization circuit. The first driver is configured to rotate the phosphor wheel. The second driver is configured to rotate the color wheel. The synchronization circuit is electrically connected to the first driver and the second driver. The color wheel has a plurality of color regions respectively corresponding to the color sections of any of the phosphor regions. The synchronization circuit is configured to synchronously control the first driver and the second driver, so as to make the light excited by any of the color sections of the phosphor regions irradiate a corresponding one of the color regions of the color wheel during the rotation of the phosphor wheel and the color wheel.

In an embodiment of the disclosure, the optical device further includes a brightness control circuit. The brightness control circuit is electrically connected to the light sources and the synchronization circuit. The brightness control circuit is configured to control output powers of the light sources and collaborate with the synchronization circuit to make the light sources emit lights with different output powers respectively to the color sections having different fluorescent characteristics during the rotation of the phosphor wheel.

In an embodiment of the disclosure, central angles of at least two of the color sections having the same fluorescent characteristic of the phosphor regions are equal.

In an embodiment of the disclosure, central angles of at least two of the color sections having different fluorescent characteristics of each of the phosphor regions are equal.

In an embodiment of the disclosure, the color wheel has a plurality of color regions respectively corresponding to the color sections of any of the phosphor regions. Central angles of at least two of the color regions having different colors are equal.

In an embodiment of the disclosure, central angles of at least two of the color sections having different fluorescent characteristics of each of the phosphor regions are not equal.

In an embodiment of the disclosure, the color wheel has a plurality of color regions respectively corresponding to the color sections of any of the phosphor regions. Central angles of at least two of the color regions having different colors are not equal.

In an embodiment of the disclosure, a straight connecting the light spots passes through a center of the phosphor wheel.

In an embodiment of the disclosure, the phosphor wheel further has two light-transmissive portions. The light-transmissive portions are configured for the light beams to pass through. When one of the light-transmissive portions moves to one of the light spots by rotating the phosphor wheel, another of the light-transmissive portions moves to another of the light spots.

According to another embodiment of the disclosure, an optical device includes a phosphor wheel, a first color section, a second color section, and two light sources. The phosphor wheel has a radian. The first color section is disposed at a first radial position of the phosphor wheel along the radian and forms a first central angle. The second color section is disposed at a second radial position of the phosphor wheel along the radian and forms a second central angle. The first color section and the second color section are coated with a first fluorescent material. The first central angle and the second central angle are equal. The light sources generate two light spots for respectively exciting the fluorescent material on the first color section and the second color section. When the phosphor wheel rotates, said two light spots excite the first fluorescent material substantially at the same time.

In an embodiment of the disclosure, the light spots excite the first fluorescent material on the first color section and the second color section at the same time.

In an embodiment of the disclosure, the optical device further includes a third color section and a fourth color section. The third color section is disposed at the first radial position of the phosphor wheel along the radian and forms a third central angle. The fourth color section is disposed at the second radial position of the phosphor wheel along the radian and forms a fourth central angle. The third color section and the fourth color section are coated with a second fluorescent material. The third central angle and the fourth central angle are equal. When the phosphor wheel rotates, the light spots excite the second fluorescent material on the third color section and the fourth color section substantially at the same time.

In an embodiment of the disclosure, the light spots excite the second fluorescent material on the third color section and the fourth color section at the same time.

In an embodiment of the disclosure, the first color section and the fourth color section are located in a sector area formed by the first central angle of the phosphor wheel.

In an embodiment of the disclosure, the optical device further includes two light-transmissive regions. The light-transmissive regions are disposed on the phosphor wheel and spaced apart from the first color section and the second color section. When the phosphor wheel rotates, the light spots pass through the light-transmissive regions substantially at the same time.

In an embodiment of the disclosure, the light spots pass through the light-transmissive regions at the same time.

In an embodiment of the disclosure, the optical device further includes a fifth color section and a sixth color section. The fifth color section and a sixth color section are disposed on the phosphor wheel and spaced apart from the first color section and the second color section. The fifth color section and the sixth color section are coated with a third fluorescent material. When phosphor wheel rotates, the light spots excite the third fluorescent material on the fifth color section and the sixth color section substantially at the same time.

In an embodiment of the disclosure, the light spots excite the third fluorescent material on the fifth color section and the sixth color section at the same time.

Accordingly, by making two light spots provided by two light sources separate from each other on the phosphor wheel, the optical device of the disclosure can reduce the output power of each of the light spots (i.e., reduce the heat accumulation), so as to prevent the fluorescent materials coated on the phosphor wheel from thermal decay effect. In addition, in the optical device of the disclosure, the phosphor wheel has two phosphor regions located at different radial positions. Therefore, during the rotation of the phosphor wheel, the approach of locating the light spots at two color sections having the same fluorescent characteristic respectively in the phosphor regions can effectively improve the brightness and the color saturation of the color corresponding to the fluorescent characteristic. Furthermore, by adjusting the central angles of the color sections (i.e., adjusting the coating ranges of the color sections), the optical device of the disclosure can achieve the purpose of adjusting the proportion and the color saturation of colors. Or, to achieve the purpose of adjusting the proportion and the color saturation of colors, the optical device of the disclosure can also collocate the synchronization circuit with the brightness control circuit to make the light sources emit lights with different output powers respectively to the color sections having different fluorescent characteristics.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 2 is a schematic circuit diagram of an optical device according to an embodiment of the disclosure;

FIG. 3 is a schematic diagram of a phosphor wheel according to an embodiment of the disclosure;

DETAILED DESCRIPTION

Figure 1A:
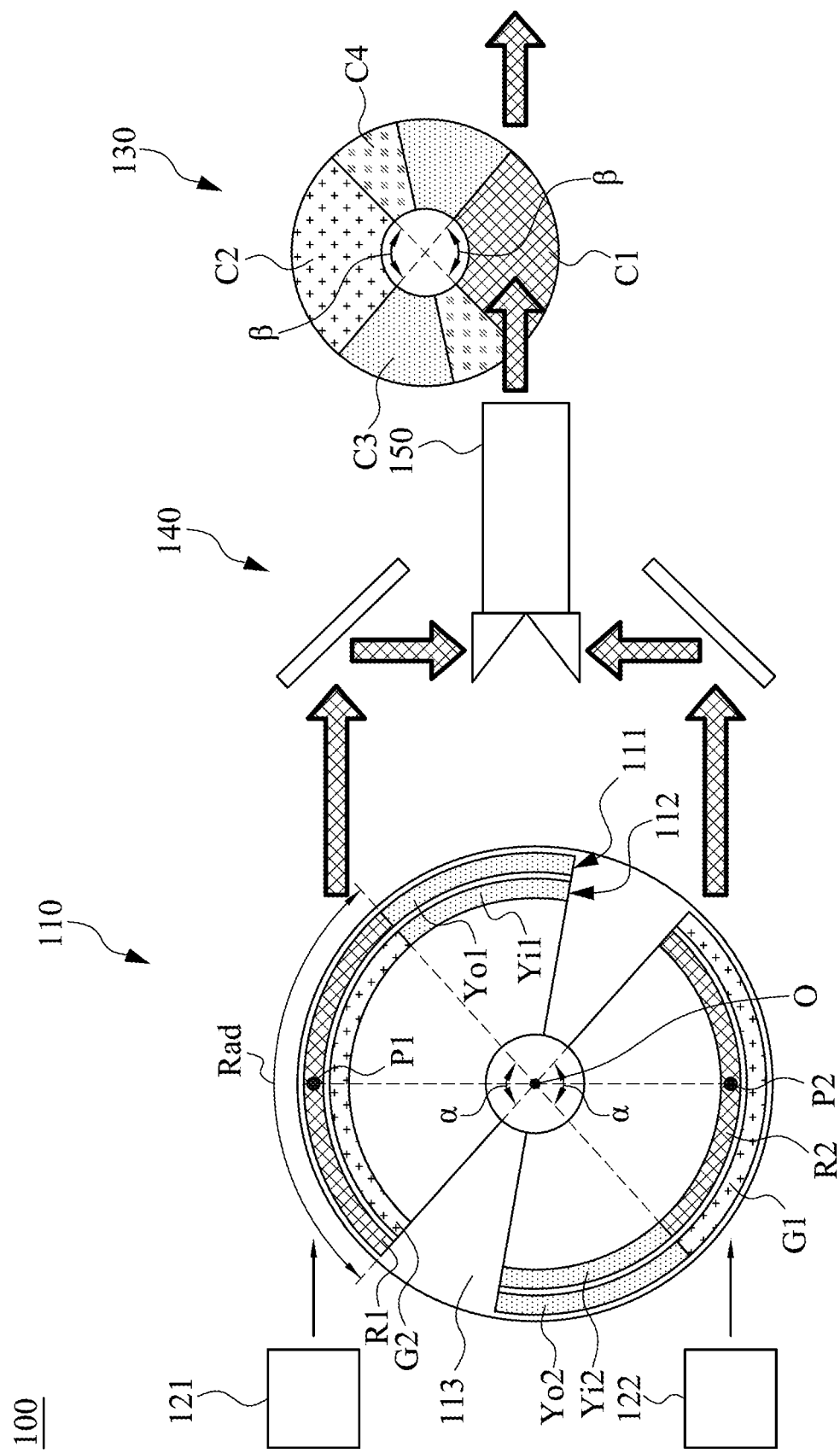
FIG. 1A is a schematic diagram of an optical device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 1B:
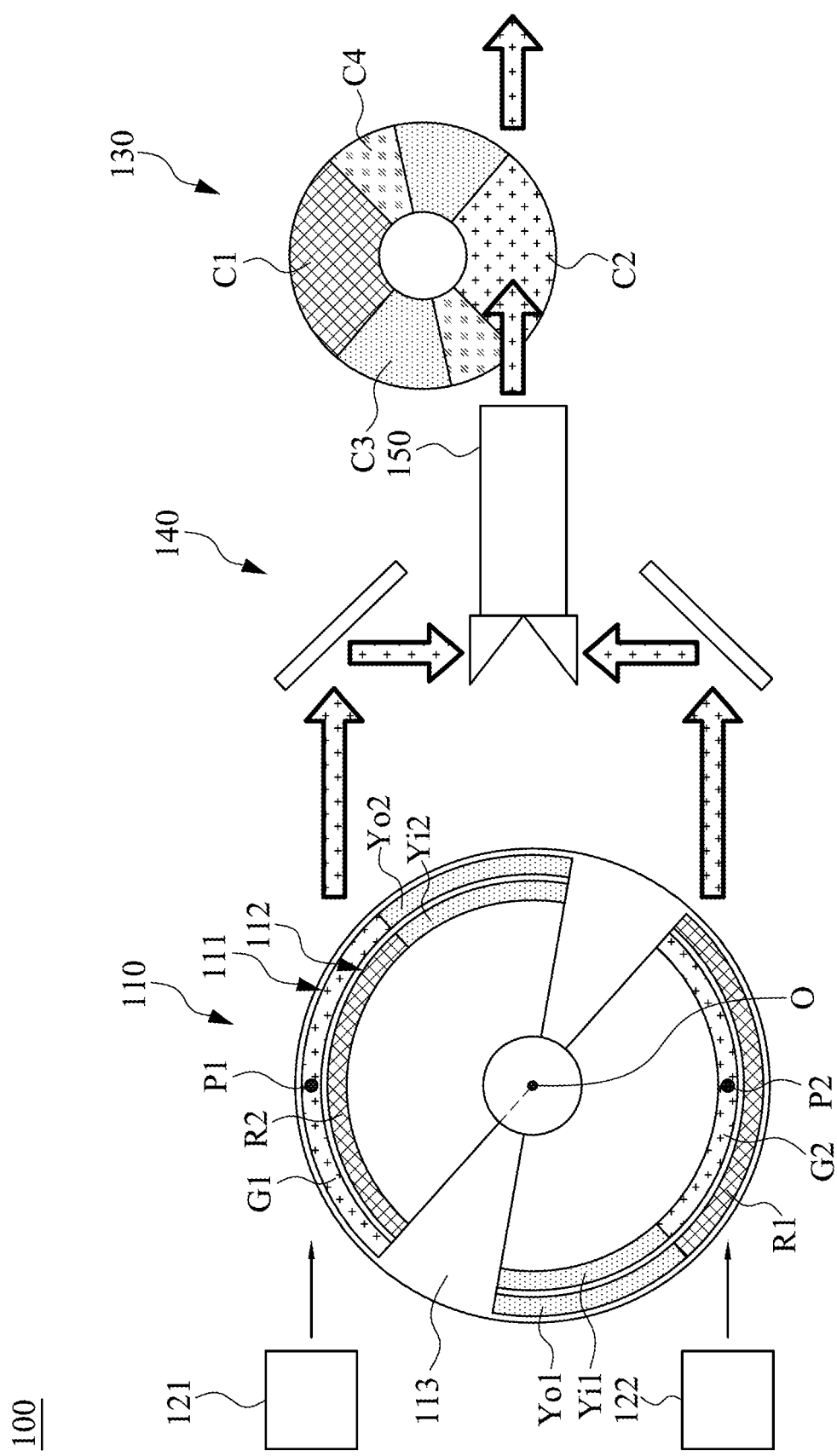
FIG. 1B is another schematic diagram of the optical device in FIG. 1A.

Reference is made to FIGS. 1A and 1B. FIG. 1A is a schematic diagram of an optical device 100 according to an embodiment of the disclosure. FIG. 1B is another schematic diagram of the optical device 100 in FIG. 1A. As shown in FIGS. 1A and 1B, in the embodiment, the optical device 100 includes a phosphor wheel 110, a first light source 121, a second light source 122, a color wheel 130, a condensing optical module 140, and an integrator rod 150. The phosphor wheel 110 has a first phosphor region 111 and a second phosphor region 112. The first phosphor region 111 and the second phosphor region 112 are located at different radial positions of the phosphor wheel 110 and not overlapped. The so-called radial position is a position apart from a center of the phosphor wheel 110 by a predetermined radius. Specifically, the first phosphor region 111 is located at the outer side of the second phosphor region 112. That is, the radius of a first radial position of the first phosphor region 111 relative to the center of the phosphor wheel 110 is larger than the radius of a second radial position of the second phosphor region 112 relative to the center of the phosphor wheel 110. The phosphor wheel 110 has a radian. The first phosphor region 111 has a plurality of color sections R1, G1, Yo1, and Yo2. The second phosphor region 112 has a plurality of color sections R2, G2, Yi1, and Yi2. The first light source 121 and the second light source 122 emit two light beams so as to respectively provide a first light spot P1 and a second light spot P2 on the phosphor wheel 110. The first light spot P1 and the second light spot P2 are respectively located at the first phosphor region 111 and the second phosphor region 112. By making the first light spot P1 and the second light spot P2 provided by the first light source 121 and the second light source 122 separate from each other on the phosphor wheel 110, the output power of each of the light spots can be reduced (i.e., reduce the heat accumulation), so as to prevent the fluorescent materials coated on the phosphor wheel 110 from thermal decay effect.

In the embodiment, the first light source 121 and the second light source 122 are blue laser solid-state light sources. The phosphor wheel 110 is a transmissive substrate and has two light-transmissive regions 113. The color sections R1 and R2 are coated with a first fluorescent material, so as to have the same fluorescent characteristic and can be respectively excited by the lights emitted from the first light source 121 and the second light source 122 to generate a first light beam and a second beam having a first specific wavelength. The first and second light beams can become red light sources after passing through corresponding color regions (e.g., the color regions C1) of the color wheel 130. The color sections G1 and G2 are coated with a second fluorescent material, so as to have the same fluorescent characteristic and can be respectively excited by the lights emitted from the first light source 121 and the second light source 122 to generate a third light beam and a fourth beam having a second specific wavelength. The third and fourth light beams can become green light sources after passing through corresponding color regions (e.g., the color regions C2) of the color wheel 130. The color sections Yo1, Yo2, Yi1, and Yi2 are coated with a third fluorescent material, so as to have the same fluorescent characteristic and can be excited by the lights emitted from the first light source 121 and the second light source 122 to generate a fifth light beam, a sixth light beam, a seventh light beam, and a eighth beam having a first specific wavelength. The first and second light beams can become red light sources after passing through corresponding color regions (e.g., the color regions C3) of the color wheel 130. The lights emitted by the first light source 121 and the second light source 122 can become blue light sources after passing through the light-transmissive regions 113 and corresponding color regions (e.g., the color regions C4) of the color wheel 130.

In some embodiments, the light-transmissive regions 113 include transparent glass, but the disclosure is not limited in this regard. In some other embodiments, the light-transmissive regions 113 are notches.

In some embodiments, the phosphor wheel 110 does not have the light-transmissive regions 113. That is, the phosphor regions on the phosphor wheel 110 can connect each other to form a continuous circle.

Specifically, the optical device 100 of the embodiment is configured to locate the first light spot P1 and a second light spot P2 at the color sections having the same fluorescent characteristic respectively in the first phosphor region 111 and the second phosphor region 112 during the rotation of the phosphor wheel 110. For example, when the first light spot P1 is located at the color section R1 of the first phosphor region 111, the second light spot P2 is located at the color section R2 of the second phosphor region 112; when the color section G1 of the first phosphor region 111 moves to the first light spot P1 by rotating the phosphor wheel 110, the color section G2 of the second phosphor region 112 moves to the second light spot P2; when the color section Yo1 of the first phosphor region 111 moves to the first light spot P1 by rotating the phosphor wheel 110, the color section Yi2 of the second phosphor region 112 moves to the second light spot P2; and when the color section Yo2 of the first phosphor region 111 moves to the first light spot P1 by rotating the phosphor wheel 110, the color section Yi1 of the second phosphor region 112 moves to the second light spot P2. When one of the light-transmissive portions 113 moves to the first light spot P1 by rotating the phosphor wheel 110, another of the light-transmissive portions 113 moves to the second light spot P2.

As shown in FIGS. 1A and 1B, the positions of the first light source 121 and the second light source 122 and the position of the color wheel 130 are respectively at opposite sides of the phosphor wheel 110, so the lights passing through the first phosphor region 111 and the second phosphor region 112 can then irradiate the color wheel 130. The condensing optical module 140 is located between the phosphor wheel 110 and the color wheel 130. The condensing optical module 140 is configured to receive the lights passing through the first phosphor region 111 and the second phosphor region 112 and then guide the excited lights to the color wheel 130. The integrator rod 150 is located between the condensing optical module 140 and the color wheel 130. The integrator rod 150 is configured to receive and uniform the lights guided by the condensing optical module 140 and then guide the lights to the color wheel 130. In practical applications, the structure of optical paths of the condensing optical module 140 is not limited by the embodiment of FIG. 1A.

Reference is made to FIG. 2. FIG. 2 is a schematic circuit diagram of the optical device 100 according to an embodiment of the disclosure. As shown in FIG. 2, in the embodiment, the optical device 100 further includes a first driver 180, a second driver 190, and a synchronization circuit 160. The first driver 180 is configured to rotate the phosphor wheel 110. The second driver 190 is configured to rotate the color wheel 130. The synchronization circuit 160 is electrically connected to the first driver 180 and the second driver 190. The color wheel 130 has a plurality of color regions C1, C2, C3, and C4. The color regions C1 correspond to the color section R1 of the first phosphor region 111 and the color section R2 of the second phosphor region 112. The color regions C2 correspond to the color section G1 of the first phosphor region 111 and the color section G2 of the second phosphor region 112. The color regions C3 correspond to the color sections Yo1 and Yo2 of the first phosphor region 111 and the color sections Yi1 and Yi2 of the second phosphor region 112. The synchronization circuit 160 is configured to synchronously control the first driver 180 and the second driver 190, so as to make the light excited by any of the color sections of the phosphor regions irradiate a corresponding one of the color regions of the color wheel 130 during the rotation of the phosphor wheel 110 and the color wheel 130. For example, the lights passing through the color regions C1 have a specific red spectrum, and the first and second light beams passing through the color sections R1 and R2 just arrive the color regions C1 through the control of the synchronization circuit 160; the lights passing through the color regions C2 have a specific green spectrum, and the third and fourth light beams passing through the color sections G1 and G2 just arrive the color regions C2 through the control of the synchronization circuit 160; the lights passing through the color regions C3 have a specific yellow spectrum, and the fifth, sixth, seventh, and eighth light beams passing through the color sections Yo1, Yo2, Yi1, and Yi2 just arrive the color regions C3 through the control of the synchronization circuit 160; and the lights passing through the color regions C4 have a specific blue spectrum, and the lights passing through the light-transmissive regions 113 just arrive the color regions C4 through the control of the synchronization circuit 160.

With the foregoing structural and optical configurations, the brightness and the color saturation of the color corresponding to each kind of the fluorescent characteristic can be effectively improved. It was found in the experiments by the applicants that compared with a conventional optical device having a single phosphor region, the optical device 100 adopting the phosphor wheel 110 having two first phosphor regions of the present embodiment can effectively increase the brightness and the color saturation of the specific colors. The practical experiments show that the brightness of red light can be increased 1-1.5%, the color ration of the red light and white light can be increased from 6.6% to 7.3%, and the brightness of green light can be increased 4-5%.

In some embodiments, the light emitted by the first light source 121 and that emitted by the second light source 122 have the same wavelength. In some embodiments, the light emitted by the first light source 121 and that emitted by the second light source 122 have different wavelengths.

As shown in FIG. 1A, in the embodiment, a straight connecting the first light spot P1 and the second light spot P2 passes through a center O of the phosphor wheel 110, but the disclosure is not limited in this regard. Reference is made to FIG. 3. FIG. 3 is a schematic diagram of a phosphor wheel 100' according to an embodiment of the disclosure. As shown in FIG. 3, a difference between the phosphor wheel 100' of the present embodiment and the phosphor wheel 100 of FIG. 1A is that the straight connecting the first light spot P1 and the second light spot P2 does not pass through the center O of the phosphor wheel 110' of the present embodiment. Specifically, compared with the phosphor wheel 100 of FIG. 1A, all of the color sections of the second phosphor region 112 and the second light spot P2 in the present embodiment rotate clockwise relative to the center O. Therefore, the first light spot P1 and a second light spot P2 can also be located at the color sections having the same fluorescent characteristic respectively in the first phosphor region 111 and the second phosphor region 112 during the rotation of the phosphor wheel 110'.

As shown in FIG. 1A, in the embodiment, central angles of at least two of the color sections having different fluorescent characteristics of each of the phosphor regions are equal. For example, the central angles of the color sections R1 and G1 in the first phosphor region 111 are equal (i.e., the central angles α), and central angles of the color sections R2 and G2 in the second phosphor region 112 are equal (i.e., the central angles α). In addition, central angles of at least two of the color sections having the same fluorescent characteristic of the phosphor regions are equal. For example, the central angle of the color section R1 in the first phosphor region 111 and the central angle of the color section R2 in the second phosphor region 112 are equal (i.e., the central angles α), and central angle of the color section G1 in the first phosphor region 111 and the central angle of the color section G2 in the second phosphor region 112 are equal (i.e., the central angles α). Moreover, central angles of at least two of the color regions of the color wheel 130 having different colors are equal. For example, the central angles of the color regions C1 and C2 are equal (i.e., the central angles β). However, the disclosure is not limited in this regard.

Figure 4A:
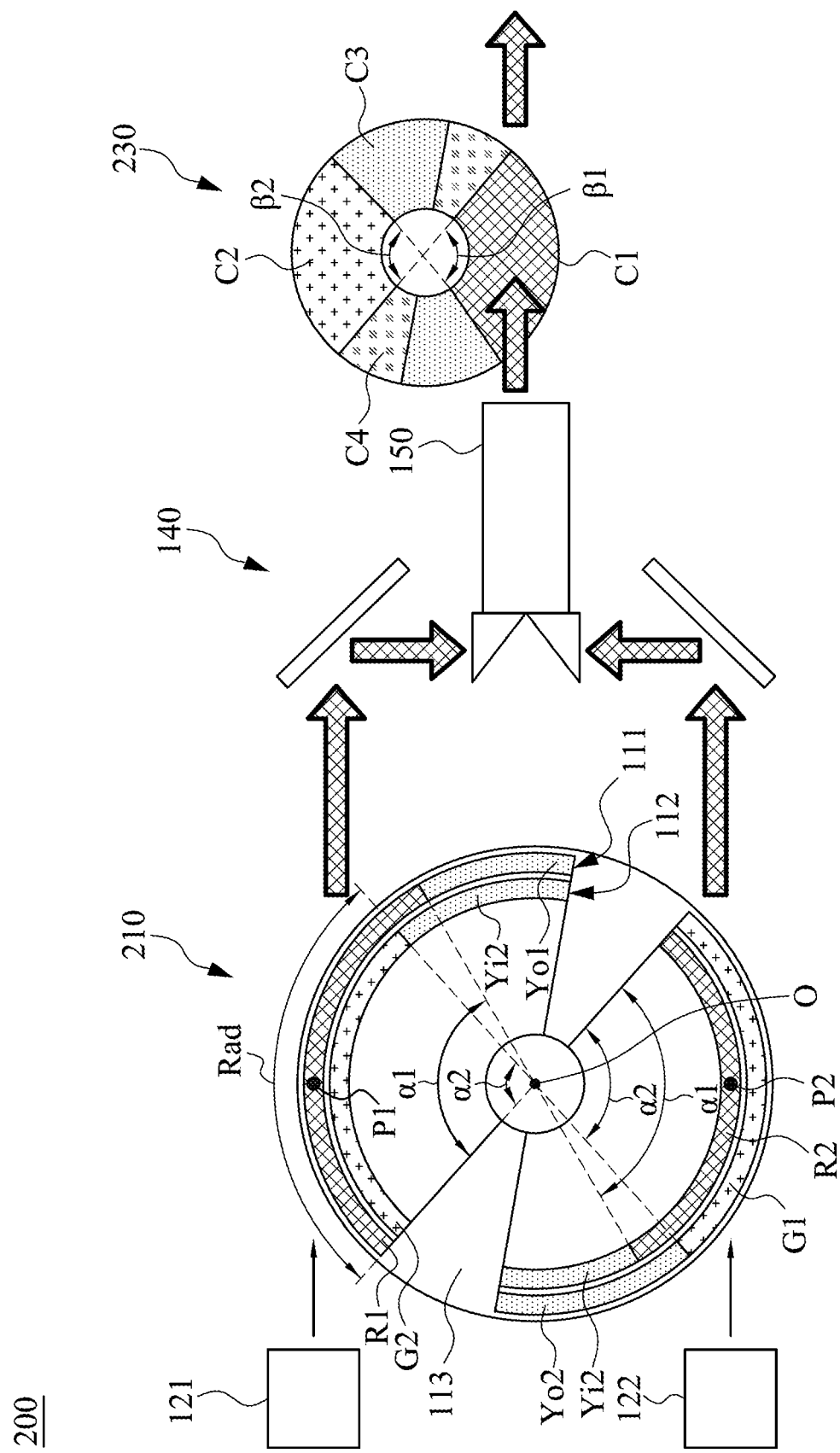
FIG. 4A is a schematic diagram of an optical device according to another embodiment of the disclosure.
Figure 4B:
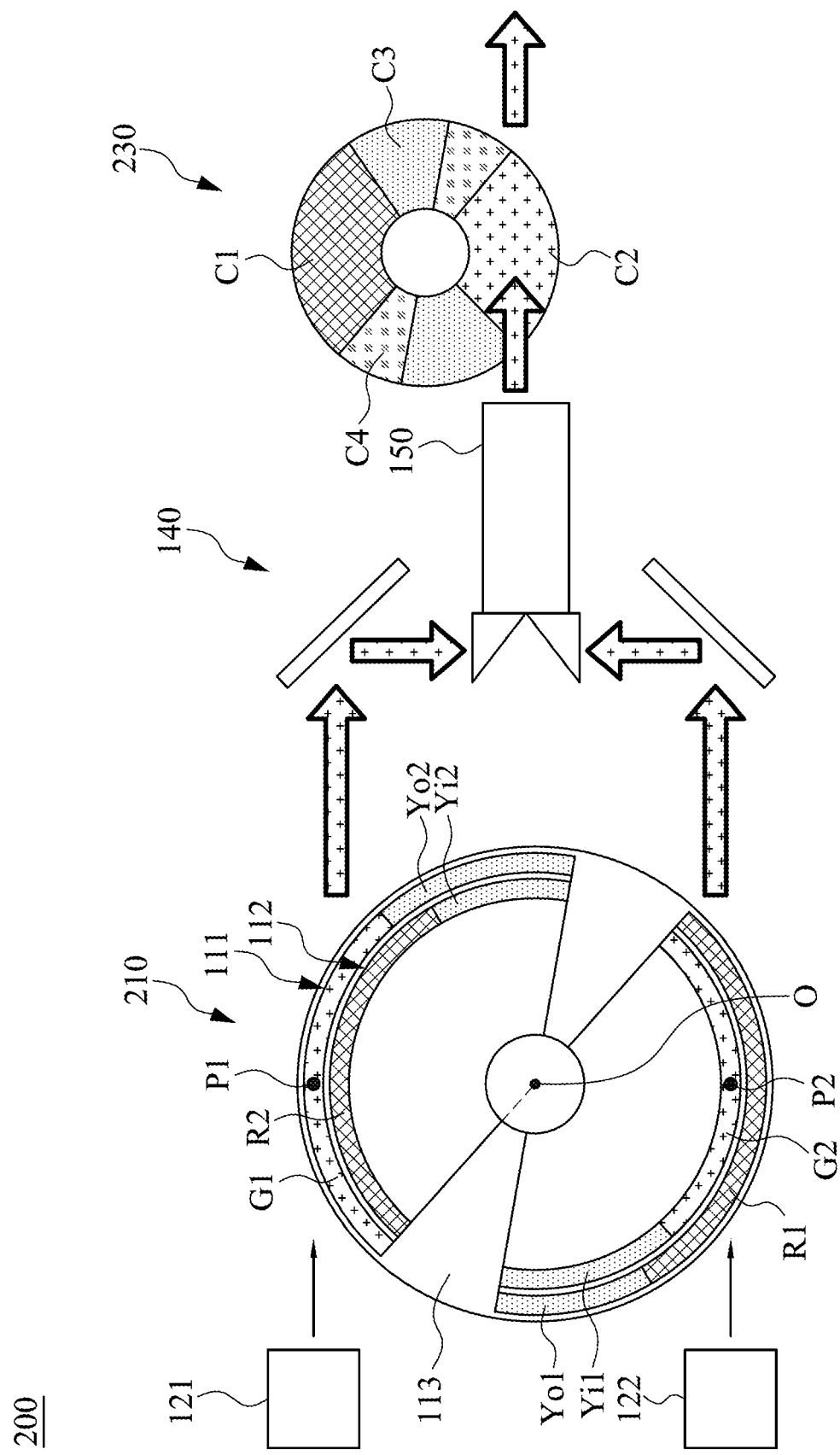
FIG. 4B is another schematic diagram of the optical device in FIG. 4A.

Reference is made to FIGS. 4A and 4B. FIG. 4A is a schematic diagram of an optical device 200 according to another embodiment of the disclosure. FIG. 4B is another schematic diagram of the optical device 200 in FIG. 4A. As shown in FIGS. 4A and 4B, in the embodiment, the optical device 200 includes a phosphor wheel 210, a first light source 121, a second light source 122, a color wheel 230, a condensing optical module 140, and an integrator rod 150, in which the first light source 121, the second light source 122, the condensing optical module 140, and the integrator rod 150 are similar to those in the embodiment of FIG. 1A and therefore are not repeated here to avoid duplicity. It should be pointed out that compared with the embodiment of FIG. 1A, the optical device 200 of the present embodiment adjust the color sections of the phosphor regions of the phosphor wheel 210, and the color regions of the color wheel 230 are also correspondingly adjusted.

Specifically, in the embodiment, central angles of at least two of the color sections having different fluorescent characteristics of each of the phosphor regions are not equal. For example, the central angle $\alpha 1$ of the color section R1 and the central angle $\alpha 2$ of the color section G1 in the first phosphor region 111 are not equal, and the central angle $\alpha 1$ of the color section R2 and the central angle $\alpha 2$ of the color section G2 in the second phosphor region 112 are not equal. In addition, central angles of at least two of the color sections having the same fluorescent characteristic of the phosphor regions are equal. For example, the central angle of the color section R1 in the first phosphor region 111 and the central angle of the color section R2 in the second phosphor region 112 are equal (i.e., the central angles $\alpha 1$), and central angle of the color section G1 in the first phosphor region 111 and the central angle of the color section G2 in the second phosphor region 112 are equal (i.e., the central angles $\alpha 2$). Moreover, central angles of at least two of the color regions of the color wheel 230 having different colors are not equal. For example, the central angle $\beta 1$ of the color region C1 and the central angle $\beta 2$ of the color region C2 are not equal.

Therefore, by adjusting the central angles of the color sections (i.e., adjusting the coating ranges of the color sections), the purpose of adjusting the proportion and the color saturation of colors can be effectively achieved. For example, as shown in FIG. 4A, the central angles $\alpha 1$ of the color sections R1 and R2 are larger than the central angles $\alpha 2$ of the color sections G1 and G2, and the central angles $\beta 1$ of the color regions C1 are larger than the central angles $\beta 2$ of the color regions C2, so the proportion and the color saturation of the red color can be increased.

Or, to achieve the purpose of adjusting the proportion and the color saturation of colors, in an embodiment, the optical device 100 can further include a coordinated controller 165 and a brightness control circuit 170. The brightness control circuit 170 is configured to control output powers of the first light source 121 and the second light source 122. By using the coordinated controller 165 shown in FIG. 2 to collocate the synchronization circuit 160 with the brightness control circuit 170, the first light source 121 and the second light source 122 can emit lights with different output powers respectively to the color sections having different fluorescent characteristics. For example, when the color section R1 of the first phosphor region 111 and the color section R2 of the second phosphor region 112 respectively move to the first light spot P1 and the second light spot P2 by rotating the phosphor wheel 110, the coordinated controller 165 can collocate the synchronization circuit 160 with the brightness control circuit 170 to make the first light source 121 and the second light source 122 emit lights having a first output power; and when the color section G1 of the first phosphor region 111 and the color section G2 of the second phosphor region 112 respectively move to the first light spot P1 and the second light spot P2 by rotating the phosphor wheel 110, the coordinated controller 165 can collocate the synchronization circuit 160 with the brightness control circuit 170 to make the first light source 121 and the second light source 122 emit lights having a second output power. If the first output power is larger than the second output power, the proportion and the color saturation of the red color can be increased. On the contrary, if the second output power is larger than the first output power, the proportion and the color saturation of the green color can be increased.

In other words, it can be seen from the foregoing embodiments that the optical device (e.g., the optical device 100 or the optical device 200) includes a phosphor wheel, a first color section (e.g., the color section R1), a second color section (e.g., the color section R2), and two light sources (e.g., the first light source 121 and the second light source 122). The phosphor wheel has a radian Rad (as shown in FIGS. 1A and 4A). The first color section is disposed at a first radial position of the phosphor wheel along the radian Rad and forms a first central angle (as the central angle α in FIG. 1A and the central angle α1 in FIG. 4A show). The second color section is disposed at a second radial position of the phosphor wheel along the radian Rad and forms a second central angle (as the central angle α in FIG. 1A and the central angle α1 in FIG. 4A show). The first color section and the second color section are coated with a first fluorescent material. The first central angle and the second central angle are equal. The radius of the first radial position relative to the center of the phosphor wheel 110 and the radius of the second radial position relative to the center of the phosphor wheel 110 are not equal. The light sources generate two light spots (i.e., the first light spot P1 and the second light spot P2) for respectively exciting the fluorescent material on the first color section and the second color section. When the phosphor wheel rotates, said two light spots excite the first fluorescent material substantially at the same time. In some embodiments, the light spots excite the first fluorescent material on the first color section and the second color section at the same time.

The optical device further includes a third color section (e.g., the color section G1) and a fourth color section (e.g., the color section G2). The third color section is disposed at the first radial position of the phosphor wheel along the radian Rad and forms a third central angle (as the central angle α in FIG. 1A and the central angle α2 in FIG. 4A show). The fourth color section is disposed at the second radial position of the phosphor wheel along the radian Rad and forms a fourth central angle (as the central angle α in FIG. 1A and the central angle α2 in FIG. 4A show). The third color section and the fourth color section are coated with a second fluorescent material. The third central angle and the fourth central angle are equal. The radius of the first radial position relative to the center of the phosphor wheel 110 and the radius of the second radial position relative to the center of the phosphor wheel 110 are not equal. When the phosphor wheel rotates, the light spots excite the second fluorescent material on the third color section and the fourth color section substantially at the same time. In some embodiments, the light spots excite the second fluorescent material on the third color section and the fourth color section at the same time. In some embodiments, the first color section and the fourth color section are located in a sector area formed by the first central angle of the phosphor wheel.

The optical device further includes two light-transmissive regions (i.e., the light-transmissive portions 113). The light-transmissive regions are disposed on the phosphor wheel and spaced apart from the first color section and the second color section. When the phosphor wheel rotates, the light spots pass through the light-transmissive regions substantially at the same time. In some embodiments, the light spots pass through the light-transmissive regions at the same time.

The optical device further includes a fifth color section (e.g., the color section Yo2) and a sixth color section (e.g., the color section Yi1). The fifth color section and a sixth color section are disposed on the phosphor wheel and spaced apart from the first color section and the second color section. The fifth color section and the sixth color section are coated with a third fluorescent material. When phosphor wheel rotates, the light spots excite the third fluorescent material on the fifth color section and the sixth color section substantially at the same time. In some embodiments, the light spots excite the third fluorescent material on the fifth color section and the sixth color section at the same time.

Figure 5:
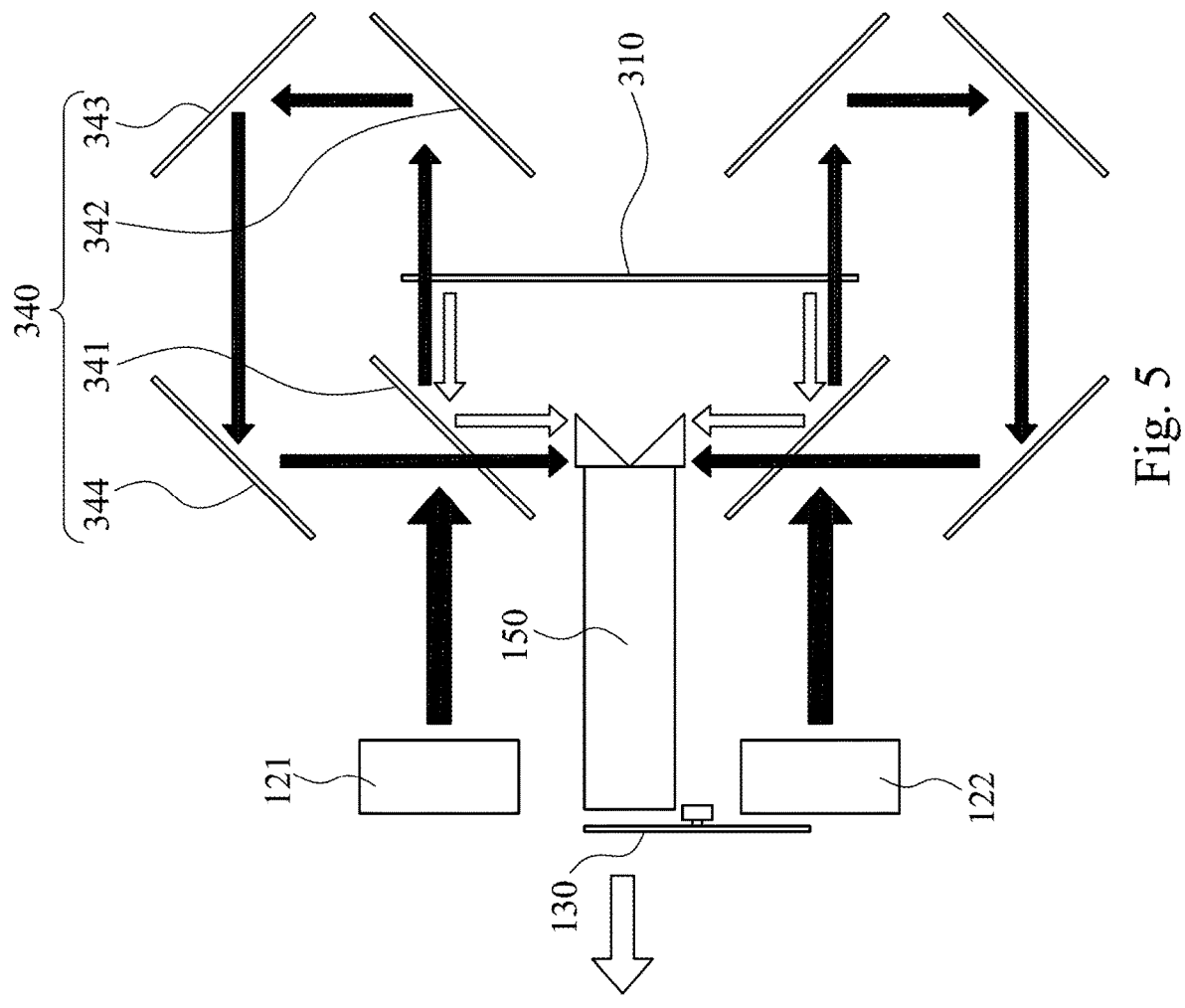
FIG. 5 is a schematic diagram of an optical device according to another embodiment of the disclosure.

Reference is made to FIG. 5. FIG. 5 is a schematic diagram of an optical device 300 according to another embodiment of the disclosure. As shown in FIG. 5, in the embodiment, the optical device 300 includes a phosphor wheel 310, a first light source 121, a second light source 122, a color wheel 130, a condensing optical module 340, and an integrator rod 150, in which the first light source 121, the second light source 122, the color wheel 130, and the integrator rod 150 are similar to those in the embodiment of FIG. 1A and therefore are not repeated here to avoid duplicity. It should be pointed out that compared with the embodiment of FIG. 1A, the optical device 300 of the present embodiment modifies the phosphor wheel 310 and the condensing optical module 340.

Specifically, in the embodiment, the phosphor wheel 310 is a half-transmissive and half-reflective substrate and has the same configuration of the first phosphor region 111, the second phosphor region 112, and the light-transmissive regions 113 on the phosphor wheel 110 shown in FIG. 1A. The difference is that the first phosphor region 111 and the second phosphor region 112 on the phosphor wheel 110 in FIG. 1A are transmissive, and the first phosphor region 111 and the second phosphor region 112 on the phosphor wheel 310 of the present embodiment are reflective. The condensing optical module 340 includes a dichroic mirror 341 and reflectors 342, 343, and 344. The dichroic mirror 341 is configured for the lights emitted by the first light source 121 and the second light source 122 to pass through and configured to reflect the lights of other wavelengths. Therefore, the lights emitted by the first light source 121 and the second light source 122 can directly pass through the dichroic mirror 341 and then arrive the phosphor wheel 310.

Based on the configuration of optical paths shown in FIG. 5, the color sections R1 and R2 on the phosphor wheel 310 can be respectively excited by the lights emitted by the first light source 121 and the second light source 122 to generate a first light beam and a second light beam having a first specific wavelength. The first and second light beams are reflected to the dichroic mirror 341 respectively by the color sections R1 and R2 and then reflected to enter the integrator rod 150 by the dichroic mirror 341, and finally become red light sources after passing through corresponding color regions (e.g., the color regions C1) of the color wheel 130. The color sections G1 and G2 on the phosphor wheel 310 can be respectively excited by the lights emitted by the first light source 121 and the second light source 122 to generate a third light beam and a fourth light beam having a second specific wavelength. The third and fourth light beams are reflected to the dichroic mirror 341 respectively by the color sections G1 and G2 and then reflected to enter the integrator rod 150 by the dichroic mirror 341, and finally become green light sources after passing through corresponding color regions (e.g., the color regions C2) of the color wheel 130. The color sections Yo1, Yo2, Yi1 and Yi2 on the phosphor wheel 310 can be excited by the lights emitted by the first light source 121 and the second light source 122 to generate a fifth light beam, a sixth light beam, a seventh light beam, and a eighth light beam having a third specific wavelength. The fifth, sixth, seventh, and eighth light beams are reflected to the dichroic mirror 341 by the color sections Yo1, Yo2, Yi1 and Yi2 and then reflected to enter the integrator rod 150 by the dichroic mirror 341, and finally become yellow light sources after passing through corresponding color regions (e.g., the color regions C3) of the color wheel 130. After passing through the light-transmissive regions 113, the lights emitted by the first light source 121 and the second light source 122 are reflected to enter the integrator rod 150 by the reflectors 342, 343, and 344 sequentially, and finally become blue light sources after passing through corresponding color regions (e.g., the color regions C4) of the color wheel 130.

According to the foregoing recitations of the embodiments of the disclosure, it can be seen that by making two light spots provided by two light sources separate from each other on the phosphor wheel, the optical device of the disclosure can reduce the output power of each of the light spots (i.e., reduce the heat accumulation), so as to prevent the fluorescent materials coated on the phosphor wheel from thermal decay effect. In addition, in the optical device of the disclosure, the phosphor wheel has two phosphor regions located at different radial positions. Therefore, during the rotation of the phosphor wheel, the approach of locating the light spots at two color sections having the same fluorescent characteristics respectively in the phosphor regions can effectively improve the brightness and the color saturation of the color corresponding to the fluorescent characteristics. Furthermore, by adjusting the central angles of the color sections (i.e., adjusting the coating ranges of the color sections), the optical device of the disclosure can achieve the purpose of adjusting the proportion and the color saturation of colors. Or, to achieve the purpose of adjusting the proportion and the color saturation of colors, the optical device of the disclosure can also collocate the synchronization circuit with the brightness control circuit to make the light sources emit lights with different output powers respectively to the color sections having different fluorescent characteristics.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical device, comprising:
a phosphor wheel having two phosphor regions, the phosphor regions being located at different radial positions of the phosphor wheel and not overlapped, each of the phosphor regions having a plurality of color sections; and
two light sources emitting two light beams so as to respectively provide two light spots on the phosphor wheel, the light spots being respectively located at the phosphor regions,
wherein during the rotation of the phosphor wheel, the light spots are located at the color sections having the same fluorescent characteristic respectively in the phosphor regions.

2. The optical device of claim 1, further comprising a color wheel configured to receive lights excited by the phosphor regions.

3. The optical device of claim 2, further comprising a condensing optical module configured to receive the lights excited by the phosphor regions and then guide the excited lights to the color wheel.

4. The optical device of claim 3, further comprising an integrator rod configured to receive the lights guided by the condensing optical module and then guide the lights to the color wheel.

5. The optical device of claim 2, further comprising:
a first driver configured to rotate the phosphor wheel;
a second driver configured to rotate the color wheel; and
a synchronization circuit electrically connected to the first driver and the second driver, the color wheel having a plurality of color regions respectively corresponding to the color sections of any of the phosphor regions, the synchronization circuit being configured to synchronously control the first driver and the second driver, so as to make the light excited by any of the color sections of the phosphor regions irradiate a corresponding one of the color regions of the color wheel during the rotation of the phosphor wheel and the color wheel.

6. The optical device of claim 5, further comprising a brightness control circuit electrically connected to the light sources and the synchronization circuit, the brightness control circuit being configured to control output powers of the light sources and collaborate with the synchronization circuit to make the light sources emit lights with different output powers respectively to the color sections having different fluorescent characteristics during the rotation of the phosphor wheel.

7. The optical device of claim 2, wherein central angles of at least two of the color sections having the same fluorescent characteristic of said two phosphor regions are equal.

8. The optical device of claim 7, wherein central angles of at least two of the color sections having different fluorescent characteristics of each of the phosphor regions are equal.

9. The optical device of claim 7, wherein the color wheel has a plurality of color regions respectively corresponding to the color sections of any of the phosphor regions, and central angles of at least two of the color regions having different colors are equal.

10. The optical device of claim 7, wherein central angles of at least two of the color sections having different fluorescent characteristics of each of the phosphor regions are not equal.

11. The optical device of claim 10, wherein the color wheel has a plurality of color regions respectively corresponding to the color sections of any of the phosphor regions, and central angles of at least two of the color regions having different colors are not equal.

12. The optical device of claim 1, wherein a straight line connecting said two light spots passes through a center of the phosphor wheel.

13. The optical device of claim 1, wherein the phosphor wheel further has two light-transmissive portions, said two light-transmissive portions being configured for said two light beams to pass through, wherein when one of said two light-transmissive portions moves to one of the light spots by rotating the phosphor wheel, another of said two light-transmissive portions moves to another of the light spots.

14. An optical device, comprising:
a phosphor wheel having a radian;
a first color section disposed at a first radial position of the phosphor wheel along the radian and forming a first central angle;
a second color section disposed at a second radial position of the phosphor wheel along the radian and forming a second central angle, wherein the first color section and the second color section are coated with a first fluorescent material, and the first central angle and the second central angle are equal;

two light sources generating two light spots for respectively exciting the fluorescent material on the first color section and the second color section, wherein when the phosphor wheel rotates, said two light spots excite the first fluorescent material substantially at the same time;

a third color section disposed at the first radial position of the phosphor wheel along the radian and forming a third central angle; and a fourth color section disposed at the second radial position of the phosphor wheel along the radian and forming a fourth central angle, wherein the third color section and the fourth color section are coated with a second fluorescent material, and the third central angle and the fourth central angle are equal;

wherein when the phosphor wheel rotates, said two light spots excite the second fluorescent material on the third color section and the fourth color section substantially at the same time.

15. The optical device of claim 14, wherein said two light spots excite the first fluorescent material on the first color section and the second color section at the same time.

16. The optical device of claim 14, wherein said two light spots excite the second fluorescent material on the third color section and the fourth color section at the same time.

17. The optical device of claim 14, wherein the first color section and the fourth color section are located in a sector area formed by the first central angle of the phosphor wheel.

18. An optical device, comprising:
a phosphor wheel having a radian;
a first color section disposed at a first radial position of the phosphor wheel along the radian and forming a first central angle;
a second color section disposed at a second radial position of the phosphor wheel along the radian and forming a second central angle, wherein the first color section and the second color section are coated with a first fluorescent material, and the first central angle and the second central angle are equal;
two light sources generating two light spots for respectively exciting the fluorescent material on the first color section and the second color section, wherein when the phosphor wheel rotates, said two light spots excite the first fluorescent material substantially at the same time; and
two light-transmissive regions disposed on the phosphor wheel and spaced apart from the first color section and the second color section, wherein when the phosphor wheel rotates, said two light spots pass through said two light-transmissive regions substantially at the same time.

19. The optical device of claim 18, wherein said two light spots pass through said two light-transmissive regions at the same time.

20. An optical device, comprising:
a phosphor wheel having a radian;
a first color section disposed at a first radial position of the phosphor wheel along the radian and forming a first central angle;
a second color section disposed at a second radial position of the phosphor wheel along the radian and forming a second central angle, wherein the first color section and the second color section are coated with a first fluorescent material, and the first central angle and the second central angle are equal;
two light sources generating two light spots for respectively exciting the fluorescent material on the first color section and the second color section, wherein when the phosphor wheel rotates, said two light spots excite the first fluorescent material substantially at the same time; and
a fifth color section and a sixth color section disposed on the phosphor wheel and spaced apart from the first color section and the second color section, wherein the fifth color section and the sixth color section are coated with a third fluorescent material, and when phosphor wheel rotates, said two light spots excite the third fluorescent material on the fifth color section and the sixth color section substantially at the same time.

21. The optical device of claim 20, wherein said two light spots excite the third fluorescent material on the fifth color section and the sixth color section at the same time.

* * * * *